Oct. 6, 1959　　　R. E. MOULDEN　　　2,907,266
AUTOMATIC COFFEE BREWER WITH COIN-CONTROLLED APPARATUS
Filed Jan. 22, 1957　　　　　　　　　　　　　3 Sheets-Sheet 1
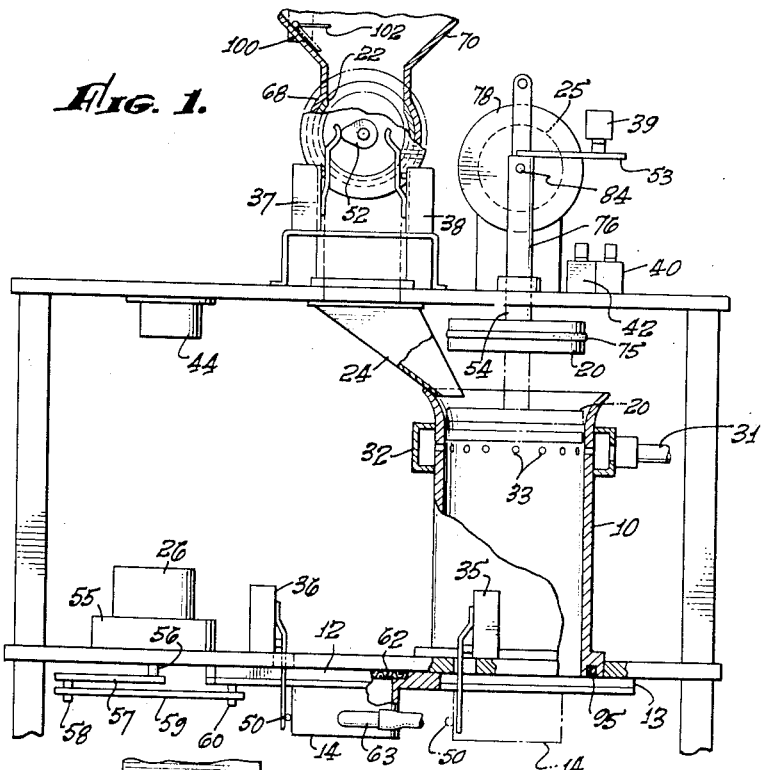
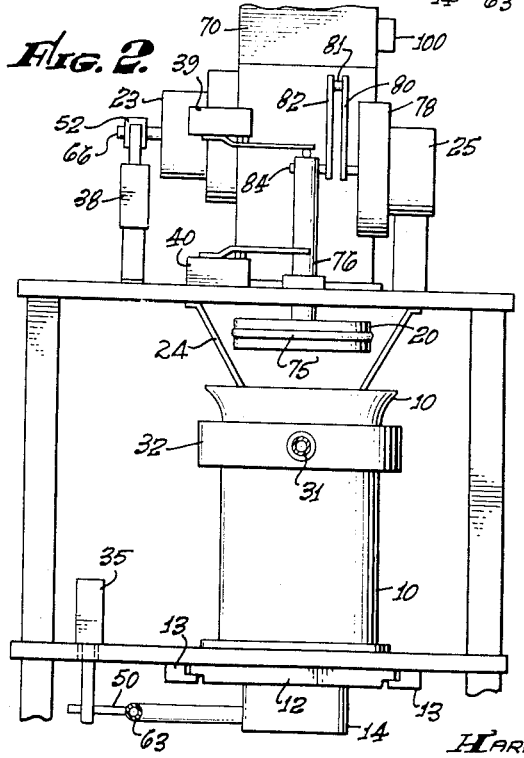
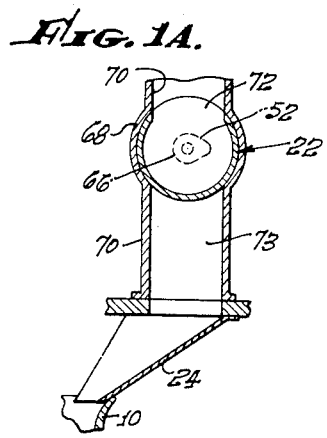
Rhoder E. Moulden,
INVENTOR.
By His Attorneys
Harris, Kiech, Foster & Harris Oct. 6, 1959 R. E. MOULDEN 2,907,266
AUTOMATIC COFFEE BREWER WITH COIN-CONTROLLED APPARATUS
Filed Jan. 22, 1957 3 Sheets-Sheet 2
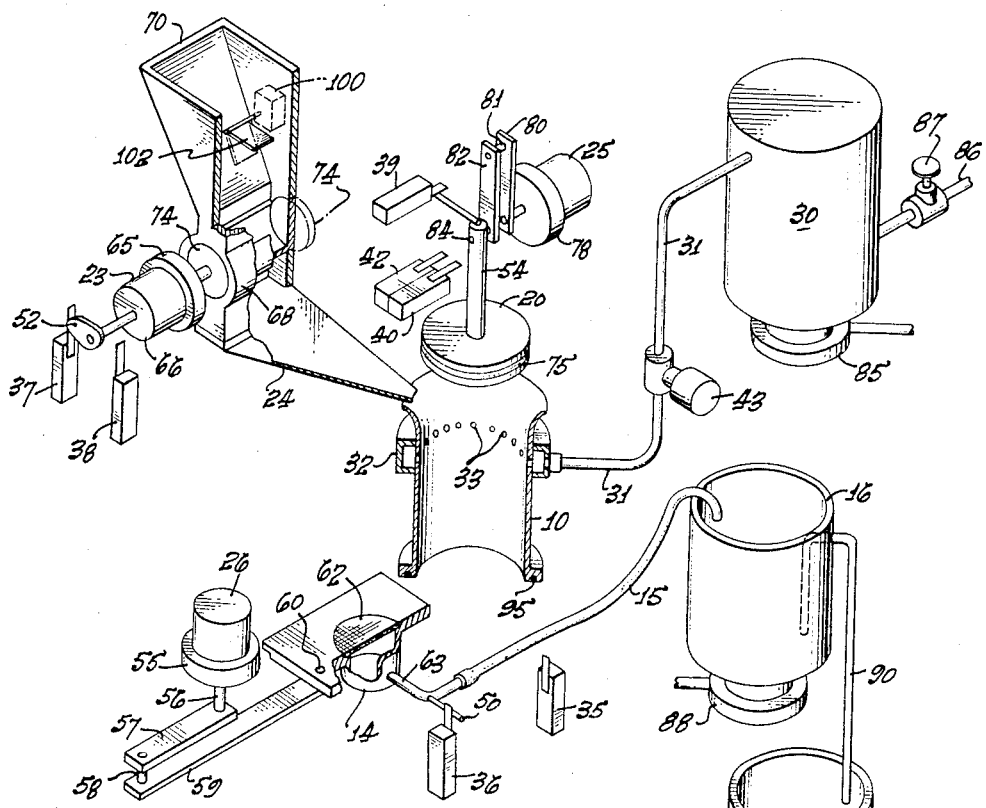
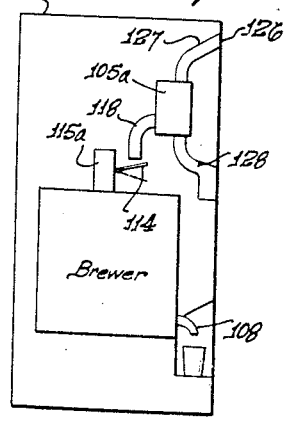
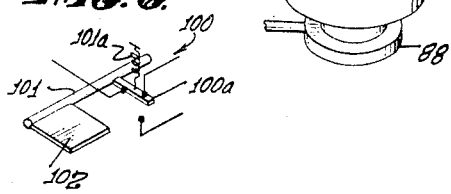
Rhoder E. Moulden,
INVENTOR.
By His Attorneys
Harris, Kiech, Foster & Harris

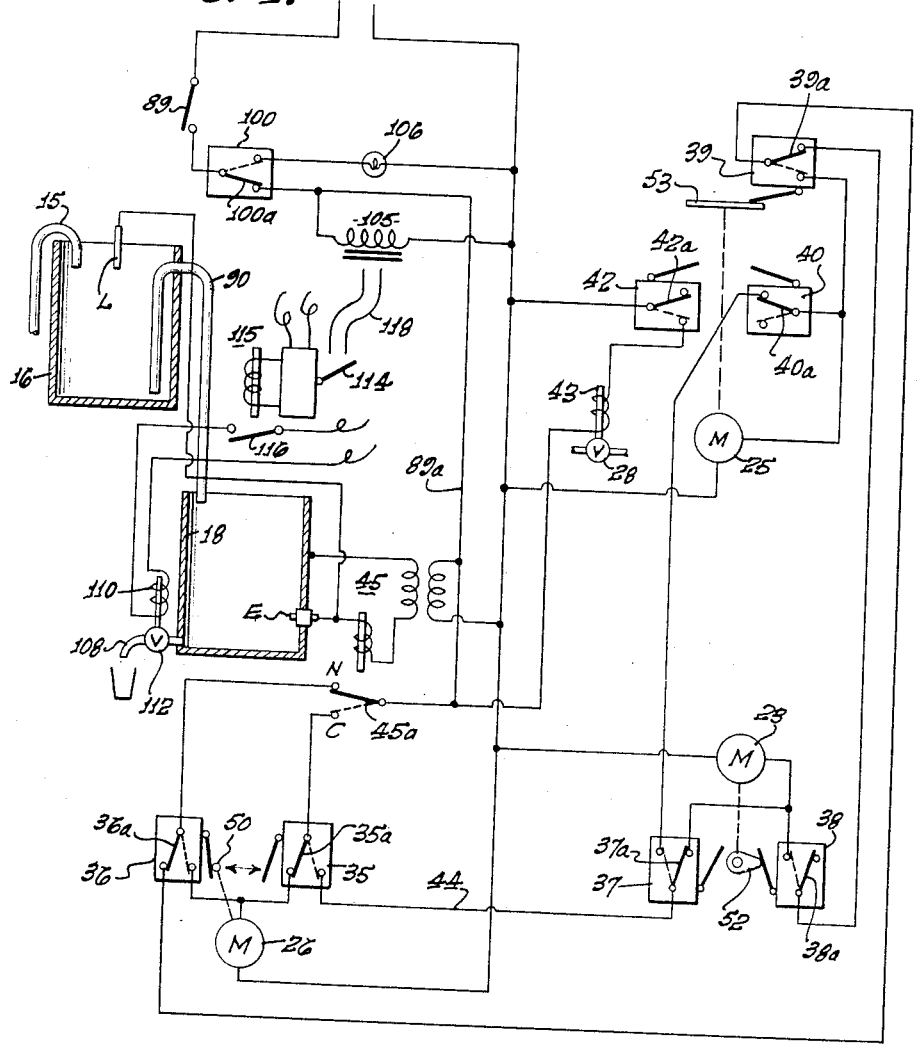

United States Patent Office 2,907,266
Patented Oct. 6, 1959

2,907,266

AUTOMATIC COFFEE BREWER WITH COIN-CONTROLLED APPARATUS

Rhoder E. Moulden, San Gabriel, Calif., assignor to Automatic Enterprises, Inc., Los Angeles, Calif., a corporation of California Application January 22, 1957, Serial No. 635,367

16 Claims. (Cl. 99—289)

This invention relates to apparatus for brewing coffee beverage intermittently as required and dispensing it in a coin-controlled vending mechanism if desired. This is a continuation-in-part of my earlier application Serial No. 572,254, filed March 19, 1956, now abandoned.

An object of the invention is to provide a relatively simple, yet novel, coffee brewer which will yield coffee brew intermittently in small quantities, so that the coffee brew will always be fresh. Another object of the invention is to provide a commercial brewer of the indicated nature which will be highly efficient and effective and partially or wholly automatic so that a quantity of fresh coffee will be brewed whenever the amount of a previous brew becomes smaller than that desired to be carried in reserve.

Many devices have heretofore been offered for brewing coffee automatically or semi-automatically and intermittently, in accordance with demands upon an associated dispensing means, but such devices characteristically have been complicated, required too many parts, and also have involved too many operations to be wholly satisfactory or economical.

It is therefore another object of this invention to produce a coffee brewer which overcomes the indicated objections, and is at the same time simple, novel and efficient to meet the needs of intermittent demands for freshly brewed coffee beverage.

It is also an object of this invention to furnish coffee-brewing equipment readily adapted for being embodied in automatic dispensing apparatus so as to function as frequently or as infrequently as necessary.

It is additionally an objection of the invention to provide a coffee brewer with a limited amount of apparatus connected into an electric system whereby the functioning of one piece of equipment controls electric means for actuating successively other means mechanically actuating in the apparatus.

Other objects of the invention and various features of construction thereof are disclosed in the following specification and in the accompanying drawings wherein certain embodiments of the invention are illustrated.

In the drawings:

Fig. 1 is a side elevation showing on a framework, electrical and mechanical elements and also various switches of one embodiment of the structure of this invention;

Fig. 1A is a vertical cross section of coffee feeding means seen in elevation in Fig. 1;

Fig. 2 is an end elevation taken from the right side of Fig. 1;

Fig. 3 is a diagrammatic perspective view showing the principal mechanical features seen in Figs. 1 and 2, together with water and brew-receiving tanks of the structure;

Fig. 4 is a wiring diagram of the electrical system in relation to the moving mechanisms of the apparatus;

Fig. 5 shows a possible modification of the coin-control portion of the wiring diagram;

Figs. 5A and 5B show other modifications of the wiring of Fig. 4;

Fig. 6 is a detailed view of a control operable by ground coffee in the feed hopper; and Fig. 7 is a diagrammatic showing of the relation of the brewer apparatus to a vending machine cabinet in which it is contained and a coin control therefor.

The structure illustrated includes a cylindrical brewer cup 10 disposed on a vertical axis and having an open top and bottom, a bottom closure or gate 12 slidable in guide rails 13 back and forth under the bottom of the cup to open and close the same, a receiver 14 carried on the under side of the gate 12 to receive the coffee brew from the cup 10 and pass it through a conduit 15 to a control tank 16 on its way to a dispensing tank 18, a vertically moving top closure or piston-like lid 20 for the top of the cup, a coffee feeder 22 operated by a motor 23 to charge a quantity of ground coffee to the brewer cup 10 via a chute 24, motor means 25 to raise and lower the cup lid 20, motor means 26 to reciprocate the gate 12 between open and closed positions, and valve means 28 for supplying hot water from a hot water pressure tank 30 via a line 31 to a manifold 32 surrounding the cup 10 to inject hot water into the cup 10 through several spray ports 33 in the wall thereof.

In addition to the mechanical parts just mentioned, there are three pairs of switches actuated at their extremes of movement by the sliding gate 12, the coffee feeder 22 and the lid 20 for the top of the brewer cup. These switch pairs are switches 35 and 36 actuated by the gate 12 at its limits of reciprocating movement, switches 37 and 38 actuated by the coffee feeder 22 at each 180° of rotation, and switches 39 and 40 actuated by movements of the lid 20 at its extremes of vertical movement. There is another switch 42 controlling a solenoid 43 for operating the water control valve 28, such switch 42 also being actuated through the movements of the lid 20. These switches are disposed in the electric circuits indicated in Fig. 4, which include a line 44 between the switches 35 and 37. Also there is a relay 45 under the control of the brew in the coffee-dispensing tank 18 and acting therefore in the capacity of a master relay.

In addition to the pairs of switches 35 and 36, 37 and 38, and 39 and 40, the switch 42 and the relay 45, there are, of course, the various circuits indicated in Fig. 4 supplying, under the control of the mentioned switches and relays, the coffee feeder motor 23, the lid-moving motor 25 and the bottom gate motor 26 which variously also actuate associated means for controlling the mentioned switches. These associated means include a rigid trip arm 50 which may be in pipe form as indicated in Fig. 3, or, as in Fig. 1, an independent arm projecting from the sliding gate 12, which closes the bottom of the brewer cup 10, such arm 50 moving in a path between the pair of switches 35 and 36. Such associated means also include a rotating trip cam 52 operated by the motor 23 of the coffee feeder 22 in a path of rotation between the pair of switches 37 and 38 to actuate these switches as required, and a rigid trip arm 53 projecting from a vertical plunger rod 54 of the piston-like lid 20, the arm 53 moving in a path between the pair of switches 39 and 40, and also actuating, at the lower end of its stroke, the switch 42 controlling the actuation of the hot-water valve 28 through the medium of the solenoid 43.

Actuation of the sliding gate 12, which closes the bottom of the brewer cup 10 for brewing purposes and later opens it for flushing purposes, is effected by the motor 26 from a speed-reduction mechanism 55 through a crank shaft 56 operating a crank arm 57 and by way of a crank pin 58 through a rigid link 59 connected to the slide gate 12 by a drive pin 60. The bottom closure gate 12 carries a filter screen 62 which separates coffee grounds in the brewer cup 10 from the brew passing therethrough into the coffee receiver 14 on the under side of the gate 12. This filtered brew passes from the receiver 14, under pressure of hot water being applied to the brewer cup 10, through a rigid conductor pipe 63 attached to the side of the brew receiver 14 (which may be part of the trip arm 50 as seen in Fig. 3 or separate as in Fig. 1) and leading to the control tank 16 by way of the previously mentioned flexible line or hose 15. The coffee feeder 22 is driven from its motor 23 through a speed-reduction device 65 and a drive shaft 66 which also rotates the cam 52 working between the pair of switches 37 and 38 controlling their operation.

The coffee feeder 22 is in the form of a cylinder rotatable by the shaft 66 within a corresponding housing 68 carried at the lower end of a hopper 70 which is longitudinally open at its bottom to discharge coffee to the previously mentioned chute 24. Such ground coffee is received from the hopper 70 through a longitudinal opening 72 (Fig. 1A) along one side thereof and corresponding generally with the opening 73 at the bottom of the hopper. Since the cylindrical coffee feeder 22, which is closed at its ends as shown, is rotated a half-revolution at a time, it receives coffee from the hopper 70 during one phase of its rotation, and then dumps such charge of coffee through its opening 72 by way of the hopper opening 73 at the opposite phase of this rotation. The end walls of the cylindrical coffee feeder 22 are generally indicated at 74 and one of them is fixed to the end of the motor driven shaft 66.

The top closure or lid 20 for the brewer cup 10 moves from the full-line elevated position of Fig. 1 to the dotted-line position thereof just above the water spray ports 33, passing to such position between the points of the curved coffee-feeding chute 24. Since the lid 20 must retain hot water and brew within the brewer cup 10 under pressure, such lid is in the form of a piston which annularly receives a rubber packing ring such as a well known O-ring 75. The plunger 54, upon the lower end of which the lid 20 is fixed, is reciprocated through a bearing bushing 76 by the motor 25 through the medium of a speed-reducing mechanism 78, a crank arm 80, a crank pin 81, and a drive link 82 pivoted to the top of the plunger 54 by a drive pin 84.

Since the coffee brew supplied by this improvement to the dispensing tank 18 is necessarily required to be hot, it is made with hot water supplied by the tank 30 under which may be a heater 85 to provide the necessary temperature. Such water may be supplied through an appropriate line 86 under the control of a convenient valve 87 as seen in Fig. 3. Similarly heaters 88 may be employed under the previously mentioned control tank 16 and dispensing tank 18 to keep their contents at such temperature as desired.

*Mechanical operation*

When it is desired to fill the dispensing tank 18, there being no coffee brew therein or the brew level being too low, a master switch 89 (Fig. 4) in the main electric circuit 89a being closed, the pole switch 45a being in its "C" position, and the other mentioned switches in their proper positions as more fully to be described herein, the first operation is movement of the bottom closure gate 12 by its motor 26 into position below the bottom of the brewer cup 10, thereby closing the latter. The coffee feed motor 23 is energized, upon completion of the movement of the slide gate 12, by the trip arm 50 and thereby rotates the coffee feeder cylinder 22 180° from the position of Fig. 1A, as a result of which ground coffee previously received from the hopper 70 is dumped down the chute 24 into the top of the brewer cup 10. Completion of the half cycle of each of these drives stops the respective motors 23 and 26. When the half cycle of the motor 23 is completed the motor 25 for the lid 20 moves the lid 20 through its downward stroke to the dotted-line position of Fig. 1 where it stops just above the water spray holes 33, energization of the motor 25 having been effected through the switch 40 by the rotating cam 52 at the end of the first half cycle of the coffee feeder motor 23. The cup lid 20 having cleared the lower end of the chute 24 overhanging the illustrated flared lip of the brewer cup 10, by which arrangement the descending lid 20 clears the end of the chute, the rigid trip arm 53 carried by the top of the plunger 54 (and traveling downward through a slot not shown in the bushing and bearing 76) actuates the switches 40 and 42 whereby to stop the lid motor 25 at the end of its half cycle through the switch 40 and energize the solenoid 43 to open the hot water valve 28 through action of the switch 42. Hot water under pressure now passes from the hot water tank 30 through the line 31 to the manifold 32 around the top of the brewer cup 10, the hot water being sprayed out through the spray ports 33 to the coffee charge previously deposited in the brewer cup 10 on top of the sliding gate 12. Air contained in the cup 10 is adequately compressed by the hot water under pressure so that the ground coffee is adequately saturated. The brew under the pressure of the hot water is forced down through the filter screen 62 in the sliding gate 12 into the receiving vessel 14 and thence by way of the projecting pipe connection 63 up through the flexible tubing 15 into the control tank 16. As presently to be described, when the control tank is sufficiently full, the brew overflows through an overflow pipe 90 into the dispensing tank 18, thus starting a siphoning action which continues until the control tank 16 is empty. When the fresh brew reaches a predetermined level in the dispensing tank 18, the circuit through the master relay 45 is restored, its pole switch 45a is moved to the N position, and the circuit through the line 44 and the switch 37 in the coffee feed motor control is broken. (The coffee feed motor 23 will later be re-energized through the switch 38 to return the feeder 22 to its charging position.) The slide gate motor 26 is now energized through the switch 36 to withdraw the slide gate 12. When the slide gate 12 is withdrawn from the bottom of the brewer cup 10, the spent coffee grounds are dumped into any suitable dumping receptacle not illustrated, hot water continuing to be sprayed through the spray ports 33 during withdrawal of the gate 12. The sudden release of water pressure by withdrawal of the gate 12 and the continuing flow of water from the spray ports 33 result in complete discharge of the coffee grounds and thorough cleansing of the walls of the brewer cup. At the same time, weak brew in the fresh brew line 15, which rises to an elevation above the filter 62, back flushes grounds on the screen 62, thereby washing off such grounds into the same dump receptacle that receives the spent grounds from the cup 10.

When the bottom gate 12 reaches the end of its return stroke, or the second half of its cycle, its trip arm 50 actuates the switch 36 so that the motor 25 is energized through the now closed switch 39 to complete its second half cycle and return the lid 20 to its elevated position, whereby its projecting arm 53 breaks this circuit to the switch 39. When the lid 20 started to rise and its rigid arm 53 released the switches 40 and 42, the latter de-energized the solenoid 43 and closed the hot water valve 28 (and the switch 40 closed for future use). At the end of the operation of the motor 25 the switch 39 is shifted to its full-line position, thereby starting the coffee motor 23 via the switch 38 and turning the coffee feeder 22 and the cam 52 through another half rotation to the starting point, thus opening and resetting the switch 38. The entire cycle is now completed, the motors 23, 25, 26 and the solenoid 43 being all de-energized and all operations being terminated.

*Operation of electrical system*

The electrical controls connected with the present brewing apparatus have been in part described as including three pairs of switches 35 and 36, 37 and 38, and 39 and 40 respectively operated by the trip means 50, 52 and 53, the switch 42 for the hot water valve 28, and the relay 45. The relay 45 is connected into the secondary winding of the transformer T shown in the wiring diagram of Fig. 4. The relay circuit in this secondary winding is normally closed through an electrode E immersed in the liquid coffee brew in the dispensing tank 18. Under these circumstances this relay circuit is closed and a single-pole, double-throw, spring-loaded pole switch 45a is retained by the solenoid of the relay in its full-line normal or N position, that is in non-brewing position. When the brew level drops to disengage the electrode E, the circuit is broken and the spring-loading causes the pole switch 45a to move to the dotted line or C (closed) position which closes the circuit through the switch 35 to the gate-actuating motor 26.

The switch 35, like all of the other switches 36, 37, 38, 39, 40 and 42, is a single-pole, spring-loaded switch whose spring-loading normally moves the exposed control arm or switch arm to its outer or projected position, such switch arm being moved to its inner or non-projected position only by the respective trip arm 50 or the trip cam 52 or the reciprocating trip arm 53 connected with the lid 20. In Fig. 4 the respective poles of these switches are indicated at 35a, 36a, 37a, 38a, 39a, 40a and 42a. Thus, when the circuit has been completed via pole switch 45a through the pole 35a of the switch 35 to the motor 26 of the gate 12, and the gate 12 starts to move to close the bottom of the brewer cup 10, the gate trip arm 50 releases the switch arm 36a of the switch 36 which arm moves from its depressed full-line position to its projected position so that the pole 36a is moved from its full-line position to its dotted-line position in readiness for future energizing of the gate motor 26. When the excursion of the gate 12 from its full-line position in Fig. 1 to its dotted-line position has been completed by operation of the motor 26, the trip arm 50 then depresses the switch arm of the switch 35 thereby moving the pole 35a from its full-line position to its dotted-line position thus breaking the circuit to the motor 26 and stopping the motor 26 with the gate 12 in closed position. The motor 26 will not now be energized through the switch 36 because the pole of the relay 45 is disengaged from its N contact.

When the pole 35a of the switch 35 was moved by the trip arm 50 to its broken line position, it energized the coffee feed motor 23 through the line 44 and the pole 37a of the switch 37 whose switch arm was at such time disengaged by the trip cam 52. The coffee feed motor 23 now passes through half a cycle to rotate the coffee-measuring and feeding cylinder 22 through 180° and dump the coffee down the chute 24 into the brewer cup 10 and on top of the closed gate 12 and its filter screen 62. Commencement of rotation of the cam 52 releases the switch arm of the switch 38 so that its pole 38a is moved by its spring-loading from the full-line position to the dotted-line position in readiness for future energization of the motor 23, which circuit, however, is now broken at the switch 36. When the coffee feed motor 23 completes the half cycle, the cam 52 will have been rotated 180° to depress the switch arm of the switch 37 and thereby break the circuit to the motor 23 through the pole 37a and shift such pole 37a to its dotted-line position whereby to close a circuit through the switch 40 of the motor 25. Thus, the coffee feed motor 23 stops, and the lid-moving motor 25 starts whereby to drive the lid 20 down from its full-line position to the dotted-line position of Fig. 1 through the lid crank 80, 81, 82. As the lid 20 descends, its trip arm 53 releases the upper lid switch 39 for movement of its pole 39a from the full-line position to the broken-line position in readiness for a second stage operation of the motor 25. When the trip arm 53 contacts the switch arm of the lower lid switch 40 at the lower end of its stroke, the pole 40a is moved to open position and the lid motor 25 stops.

When the trip arm 53 of the lid 20 depresses the switch arm of the switch 40, it also depresses the switch arm of the switch 42, thus energizing the solenoid 43 to open the hot water valve 28 and pass hot water to the manifold 32 and thence spray it through the ports 33 onto the coffee in the brewer cup 10. The lid 20 being now sealed in the top of the brewer cup 10 by means of the O-ring 75, the hot water under pressure is forced down through the filter screen 62 into the brew receiver 14 and thence through the pipe 63 to the flexible tubing 15 and into the control tank 16. Another O-ring 95 in the lower edge of the cup 10 seals the gate 12.

Hot water flow to the brewer cup 10 continues until the coffee level in the control tank 16 rises to overflow into the dispensing tank 18. When such overflow is effected, siphoning commences through the overflow tube 90 and the brew collects in the tank 18. When the brew level rises in the tank 18 to the electrode E, the circuit through the relay 45 is restored and the relay pole switch 45a is moved from the C position to the N position. This breaks the circuit through the switch 35 and the line 44, closes the circuit to the slide gate motor 26 via the pole 36a of the switch 36, and supplies a circuit to the switch 39 for subsequently closing the circuit to the coffee feed motor 23 through the switch 38.

Energization of the slide motor 26 causes withdrawal of the slide gate 12 to its open position, whereupon the spent coffee grounds in the brewer cup 10 are discharged, the inner walls of the cup 10 being completely washed free of spent grounds by hot water continuing to issue from the spray ports 33. Backflow of weak brew in the flexible line 15 flushes out the strainer screen 62 and washes off the top of the gate 12. When the gate 12 completes its outward excursion, its trip arm 50 depresses the switch arm of the switch 36 breaking the circuit through such switch 36 to the gate motor 26 and stopping the motor 26. When the trip arm 50 started its outward movement and disengaged the switch arm of the switch 35, the pole 35a of this switch returned to its original full-line position in readiness for completing the circuit therethrough to the motor 26 on a future demand.

Depression of the switch arm of the rear switch 36, shifting its pole 36a to the full-line position, results in closing the circuit to the upper switch 39 of the lid-operating motor 25, the pole 39a thereof having previously moved to the dotted-line position when released by the downward movement of the trip arm 53 with the lid 20. The motor 25 is now energized and commences the second half of its cycle to raise the lid 20. After a short interval, e.g. a few seconds, the switch arm of the water valve switch 42 is released and the pole 42a of such switch moves to its open position thus de-energizing the solenoid 43 and resulting in closing of the hot water valve 28, the walls of the brewer cup 10 having by this time been thoroughly flushed. When the trip arm 53 has been moved by the motor 25, together with the lid 20, to the elevated position, the switch 39 is actuated to full-line position and the motor 25 stops.

However, when the switch 39 is actuated to the full-line position upon stoppage of the motor 25, a circuit is completed to the coffee motor 23 via the line from the switch 36 and through the switch 38 so that the coffee-measuring cylinder 22 is rotated back to charging position, and the cam 52 is rotated back to its original position to throw the switch 38, thus breaking the circuit and stopping the motor 23 at the end of is cycle.

All motors are now stopped, the switches are set for another full cycle, and the relay 45 containing the electrode E is energized to hold its pole 45a in the normal or N position as long as the liquid coffee brew submerges the electrode E and thereby prevents energization of the gate motor 26 and institution of a new cycle.

If desired, a second electrode L may be set in the circuit of the relay 45 at the top of the control tank 16 to be contacted by the surface of the brew when the tank 16 is filled, thereby to complete this relay circuit, the overflow through the tube 90 on to the electrode E maintaining the circuit until the brew level in the tank 18 reaches the electrode E.

While much of the necessary framework is indicated in Figs. 1 and 2, none is deemed to be required in Fig. 3, nor are the parts shown considered necessary to be designated by reference characters or to be described.

*Coin control and control by ground coffee*

In addition to the above-described electrical system, it is often desirable to employ such a system in a coin-controlled apparatus and also to control such a system through the presence of ground coffee in the hopper 70. For this purpose a ground coffee-operated switch 100 is mounted on the hopper 70 and is connected into the main circuit as seen at the upper left of Fig. 4, or as indicated in the modification of Fig. 5. As seen in Figs. 3 and 6 the switch 100 is actuated by a spring-controlled rock-shaft 101 extending through a side wall of the hopper 70 and carrying a small plate 102 that is depressed to an angular position against or adjacent the back wall of the hopper 70 by reason of the weight of coffee in the hopper 70 and the wedging action of coffee located between the front and back walls of the hopper. When ground coffee in the hopper 70 is exhausted, the relief of weight and pressure upon the control plate 102 permits the spring 101a (Fig. 6) controlling the shaft 101 to raise the released plate 102 with rotation of the shaft 101 to circuit-breaking position. This switch may act to completely de-energize the coffee-brewing system, as indicated in Fig. 4, or merely to deenergize a conventional coin-control 105 (Figs. 4 and 5). It also energizes a "sold-out" light 106. When ground coffee is fed into the hopper, it readily lowers the plate 102 to the depressed position to change the switch 100 and energize the coin-control 105; the pressure or wedging action of accumulated ground coffee insures retention of such position. Like the other switches described, the switch 100 may have a spring-loaded pole 100a which normally is held by the ground coffee in the solid-line position of Figs. 4 and 5 to maintain energization of the coin-control 105 which is here illustrated as being a typical magnetic control for passing proper coins to energize the dispensing means. If the coffee supply becomes exhausted, so that the pole 100a is moved by its spring loading from the solid line position to the dotted line position, the coin control 105 is de-energized so that coins will be returned and the "sold-out" light 106 is illuminated. If the brewer system is energized as in Fig. 4 via the switch 100 by the same line supplying the coin-control 105, the brewer system is also entirely de-energized when the ground coffee supply runs out. Otherwise the brewer system may be energized by a branch line 107 as in Fig. 5 so that it will not be de-energized until the last coffee brewing cycle initiated before coffee exhaustion has been completed.

It may also be desirable to cause the coin control 105 to control directly a coffee-dispensing spout 108. This is diagrammatically illustrated in Fig. 4 as being accomplished through a solenoid 110 actuating a valve 112 in the spout 108. This control is effected through the medium of a coin-actuated trip 114 of a time controlled relay 115 actuating a switch arm 116 in the circuit to the solenoid 110. The lines to the relay 115 and the solenoid 110 are of course connected into the main electric lines feeding the system. The trip 114 is arranged to receive and be actuated by a coin from a coin chute 118 supplied by the coin control 105.

In addition to employing only the coffee actuated switch 100 in the circuits shown, it may of course be desirable also to employ a conventional cup actuated switch 120, as in Figs. 5 and 5A, arranged in series with the coffee-actuated switch 100, so that either of these switches may energize the "sold out" light 106 and cut off the coin-control 105. The switch 120 may have a spring loaded pole 120a and operate exactly like the switch 100. As indicated in Fig. 5B, the coffee controlled switch 100 (with or without the cup-controlled switch 120) may be used to control the brewer system without the coin mechanism 105 and with or without the sold-out light 106. Such arrangement is desirable for restaurant use.

In Fig. 7 there is illustrated the relation of the brewer unit and the coin control mechanism to a vending cabinet 125 in which these parts are contained. Here a cabinet 125 has a coin slot 126 feeding into a coin chute 127 leading into a housing 105a for the previously described coin control 105, from which housing 105a the previously described coin chute 118 passes a coin to the trip 114 controlling the relay 115 appropriately contained in a relay housing 115a, all of which are operatively related to the brewer mechanism as previously described. Coins to be returned will be passed to a conventional return chute 128.

The invention claimed is:

1. Beverage-brewing apparatus including in combination: a brewer cup to receive solid beverage materials and disposed on a vertical axis and having its top and bottom open; a bottom closure movable under said cup; a top closure for the top of said cup; measuring means to feed solid beverage materials into said cup; means for feeding hot water to said cup; means to move said bottom closure between open and closed positions; means to move said top closure between open and closed positions; means to move said measuring means to and from feeding position; control means for said bottom closure moving means to move such closure to closing position; means in the path of said bottom closure means to be actuated thereby at the end of its closing movement for starting said measuring and feeding means to feed beverage materials into said cup; means actuated by said measuring and feeding means at the end of its feeding movement for starting said top closure moving means for moving said top closure to closed position; means actuated by such top closure means at the end of its closing movement to energize said hot water feeding means; tank means receiving brew from said bottom closure; brew-level sensitive means in said tank means; and means under control of said brew-level sensitive means to de-energize said hot water feeding means and open said closures.

2. Apparatus as in claim 1 wherein: said means under control of said brew-level sensitive means starts return of said bottom closure moving means; means is provided in the return path of said bottom closure means to start return of the top closure moving means to uncover the brewer cup and to start return movement of said measuring and feeding means; means is provided at the end of the path of the return movement of the top closure means to de-energize the moving means therefor; and means is provided at the end of the return movement of said measuring and feeding means to de-energize the moving means therefor.

3. Apparatus as in claim 2 wherein said brew-level sensitive means includes an electric relay controlling the circuit to said measuring and feeding means and a circuit to said moving means for said top closure moving means and said bottom closure moving means.

4. Apparatus as in claim 1 wherein said brew-level sensitive means includes an electric relay controlling the circuit to said measuring and feeding means and a circuit to said moving means for said top closure moving means and said bottom closure moving means.

5. Beverage brewing apparatus including in combination: a brewer cup to receive solid beverage materials and having an open discharge end and an open receiving end; a slide moving across said discharge end and having a brew receptacle thereon and filter means leading to said receptacle from the face of said slide communicating with said cup; an electric motor to drive said slide; a closure movable to and from the receiving end of said cup; an electric motor to drive said closure to and from closing position; a feeder to supply measured quantities of solid beverage materials to said cup; a motor to drive said feeder; a manifold about said cup and communicating through ports with the interior of said cup; means to feed hot water to said manifold; a pair of electric switches arranged at the extremes of movement of said slide; a pair of electric switches arranged at the extremes of movement of said closure; a pair of electric switches arranged at the extremes of movement of said feeder, the switch at the end of the closing movement of said slide energizing said feeder, the switch at the end of the feeding movement of said feeder energizing the motor for said top closure, the switch at the end of the closing movement of said closure de-energizing the closure-moving motor; and another switch at the end of the closing movement of said closure controlling said hot water feeding means and being actuated at the end of such closing movement.

6. Brewing apparatus including: a cup arranged on a vertical axis and open at its top and bottom; a gate arranged adjacent said bottom to open and close the same; means to impart rectilinear motion to said gate for opening and closing said bottom; a closure arranged adjacent said top to open and close the same; means to impart rectilinear motion to said closure for opening and closing said top; means to introduce measured beverage solids into said cup and on said gate when closed; means actuable by said gate as it is closed to impart movement to said solids-introducing means; means actuable by said solids-introducing means after its solids-introducing movement to impart movement to said closure-moving means to close the closure; means to introduce water to said cup; means actuable by said closure as it is closed to impart activity to said water-introducing means; and means to filter and withdraw resultant brew from said cup.

7. Brewing apparatus as in claim 6 including electric motors to move said gate, said solids-introducing means and said closure, and electric switches actuated by such gate, solids-introducing means, and closure at the ends of such actuating movements to energize successively the motors for said solids-introducing means, said closure, and the water-introducing means.

8. Apparatus as in claim 1 including: means to supply solid beverage materials to said measuring means: and control means connected with said supply means and actuable by said solid beverage materials present in said supply means to supply energy to actuate said apparatus and movable in the absence of such materials to cut off energy from said apparatus.

9. Apparatus as in claim 1 including: power supplying means; and control means connected to said measuring means and actuable by solid beverage materials present and connected to said power supplying means to pass power to the apparatus and movable upon exhaustion of solid beverage materials in said measuring means to cut off power.

10. Coffee-brewing apparatus including in combination: a brewer cup having an open top and bottom; a bottom gate for closing the bottom of said cup; means to withdraw said gate to drop contents of said cup, and to return said gate to close the bottom of the cup; a brew receiver carried by said gate to receive liquid brew from said cup; means to conduct brew from said receiver to an accumulating tank; solid coffee feeder means; means to conduct solid coffee from said feeder means to the open top of said cup; a movable closure for the top of said cup; means to move said top closure between positions opening and closing said top of said cup; means to supply hot water under pressure to said cup when said top closure and bottom gate are in cup-closing position; and automatic means for successively actuating said gate, said coffee feeder means, said top closure, and said water supply means, such automatic means including: opposed electric switches arranged at the ends of the stroke of said gate to open and close electric circuits to said coffee feeder means and said top closure moving means; throw means connected with and driven by said coffee feeder means; opposed electric switches arranged at the ends of the stroke of said throw means to open and close electric circuits to said top closure-moving means and said gate moving means; alternating means connected with said top closure means and movable thereby; opposed switches arranged at the ends of the movement of said alternating means and actuable thereby to open and close electric circuits to said coffee feeder means and said gate-moving means; and switch means actuable by said top closure to open and close a circuit to said hot water supply means.

11. Apparatus as in claim 10 including a master circuit, a brew-accumulating tank connected to said brewer cup, and brew-level actuated means in said tank and in said master circuit and controlling said master circuit.

12. A self-contained, automatic apparatus for brewing beverages from solid beverage materials including in combination: a tubular brewing chamber disposed on a vertical axis having an open top and bottom; a movable closure for the top of said chamber; means to move said top closure between positions opening and closing the top of said chamber; a movable closure for the bottom of said chamber; means to move said bottom closure between positions opening and closing the bottom of said chamber; a perforate filter section in said bottom closure; a brew receiver carried by said bottom closure to receive liquid brew passing through said filter section from said chamber; conduit means for conducting brew from said receiver to an accumulating tank; feeder means to measure and feed solid beverage materials into the top of said chamber; means to supply hot water under pressure to said chamber when said top and bottom closures are in chamber-closing positions; and automatic means for successively actuating said top closure moving means, said bottom closure moving means, said feeder means, and said water supply means, such automatic means including: opposed electric switches actuated by the limits of movement of said bottom closure to open and close electric circuits to said feeder means and said top closure moving means; throw means moved by said feeder means; opposed electric switches arranged at the ends of movement of said throw means and actuatable thereby to open and close electric circuits to said top closure-moving means and said bottom closure moving means; second throw means moved by said top closure; opposed switches arranged at the ends of movement of said second throw means and actuatable thereby to open and close electric circuits to said feeder means and said bottom closure moving means; and switch means actuatable by said top closure to open and close a circuit to said water supply means.

13. Beverage-brewing apparatus including: a brewer cup having an open top and an open bottom; a gate for closing the bottom of said cup; means to withdraw said gate to drop contents of said cup from said bottom, and to return said gate to close the bottom of said cup; a brew receiver carried by said gate to receive liquid brew from said cup; means to conduct brew from said receiver to an accumulating tank; solid beverage-material feeder means; means to conduct solid beverage-material from said feeder means to the open top of said cup; a movable closure for the top of said cup; means to move said top closure between positions opening and closing said top of said cup; means to supply hot water under pressure to said cup when said top closure and bottom gate are in cup-closing position; and automatic means for successively actuating said gate, said feeder means, said top closure, and said water supply means, such automatic means including: opposed control means arranged at the ends of the stroke of said gate to open and close electric circuit to said feeder means and said top closure moving means; throw means connected with and driven by said feeder means; opposed control means arranged at the ends of the stroke of said throw means to open and close electric circuits to said top closure moving means and said gate moving means; alternating means connected with said top closure means and movable thereby, opposed control means arranged at the ends of the movement of said alternating means and actuatable thereby to open and close electric circuits to said feeder means and said gate moving means; and control means actuatable by said top closure to open and close a circuit to said hot water supply means.

14. Apparatus as in claim 13 including a master circuit, a brew accumulating tank connected to said brewer cup, and brew-level actuated means in said tank and in said master circuit and controlling said master circuit.

15. Apparatus as in claim 13 including: means to supply solid beverage material to said feeder means; and control means connected with said supply means and actuable by said solid beverage material present in said supply means to supply energy to actuate said apparatus, and movable in the absence of solid beverage material to cut off energy from said apparatus.

16. Apparatus as in claim 13 including: power supply means; and control means connected to said feeder means and actuable by solid beverage material present and connected to said power supply means to pass power to the apparatus and movable upon exhaustion of solid beverage material in said feeder means to cut off power.

References Cited in the file of this patent

UNITED STATES PATENTS

| | | |
|---|---|---|
| 1,390,008 | Arduino | Sept. 6, 1921 |
| 1,665,728 | Canright | Apr. 10, 1928 |
| 1,716,266 | Flamm | June 4, 1929 |
| 1,804,795 | Lee | May 12, 1931 |
| 1,805,159 | Bauer et al. | May 12, 1931 |
| 1,813,872 | Bausman | July 7, 1931 |
| 1,822,433 | Brand | Sept. 8, 1931 |
| 2,014,325 | Grilli | Sept. 10, 1935 |
| 2,256,976 | Ford | Sept. 23, 1941 |
| 2,447,692 | Evensen | Aug. 24, 1948 |
| 2,622,504 | Crate | Dec. 23, 1952 |
| 2,718,843 | Jones | Sept. 27, 1955 |
| 2,750,871 | Landgraber et al. | June 19, 1956 |
| 2,761,200 | Arnett | Sept. 4, 1956 |
| 2,827,845 | Richeson | Mar. 25, 1958 |

UNITED STATES PATENT OFFICE
CERTIFICATE OF CORRECTION

Patent No. 2,907,266

October 6, 1959

Rhoder E. Moulden

It is hereby certified that error appears in the printed specification of the above numbered patent requiring correction and that the said Letters Patent should read as corrected below.

Column 1, line 46, for "objection" read -- object --; column 10, line 73, for "circuit" read -- circuits --; column 11, line 4, for "thereby," read -- thereby; --.

Signed and sealed this 12th day of April 1960.

(SEAL)
Attest:

KARL H. AXLINE
Attesting Officer

ROBERT C. WATSON
Commissioner of Patents